United States Patent

[11] 3,569,707

[72] Inventors Daniel Binder
 Santa Ana;
 Willard M. Peffley, Fullerton, Calif.
[21] Appl. No. 629,205
[22] Filed Apr. 7, 1967
[45] Patented Mar. 9, 1971
[73] Assignee The United States of America as represented by the Secretary of the Navy

[54] SYSTEM FOR MEASURING PULSED RADIATION BY MEANS OF STRAIN GAUGE TECHNIQUE
3 Claims, 2 Drawing Figs.
[52] U.S. Cl. ................................................... 250/83.3, 250/83.1, 73/88.5
[51] Int. Cl. ....................................................... G01b 15/06
[50] Field of Search ............................................ 250/83.3 (IR), 83.1, 106 (VC); 73/16, 88.5

[56] References Cited
UNITED STATES PATENTS
3,248,538  4/1966  McCauley et al. ............. 250/106X
3,410,132  11/1968  Hall .............................. 73/88.5

Primary Examiner—Archie R. Borchelt
Assistant Examiner—D. L. Willis
Attorneys—R. S. Sciascia, R. I. Tompkins and W. B. Childs ABSTRACT: This is a system for measuring the energy absorbed by a material subject to pulsed nuclear radiation by detecting the thermal expansion of the material with strain gauge techniques.

SYSTEM FOR MEASURING PULSED RADIATION BY MEANS OF STRAIN GAUGE TECHNIQUE

This invention relates to a system for measuring energy absorbed in a material subject to pulsed nuclear radiation and more particularly to a system which utilizes strain gauge techniques to accomplish this measurement.

Previous methods of detecting the radiation absorbed by a material subjected to pulsed nuclear energy involved primarily measuring the temperature rises in the material or the ionization of the material resulting from the radiation. In limited applications both of these methods have proven satisfactory; however, a problem with the calorimetric methods is the requirement of an intimate thermal contact between the material and the thermal sensor, usually a thermocouple. In order to obtain a reliable measurement after a short radiation pulse, thermal equilibrium must be established with the thermocouple junction before any heat is lost to the surroundings. Thus, such methods are primarily usable with materials having high thermal conductivity. The present method measures the thermal expansion of the test material instead of the temperature rise, thereby replacing the critical thermal link with a more reliable mechanical link.

It is an object of the present invention to provide an improved system for measuring pulsed radiation utilizing strain gauge techniques.

It is a further object of the present invention to provide an improved system for measuring pulsed radiation which relies on a mechanical link between the material and sensor, rather than a thermal link.

The above and other objects of the invention are accomplished in a system wherein a strain gauge is attached to a sample of test material and a second strain gauge is attached to a sample of reference material. These gauges are electrically coupled into a Wheatstone bridge circuit as two legs of the circuit, the output of which, in turn, is electrically coupled to an electronic amplifier and to an indicating device such as a chart recorder or an oscilloscope. Thus, inbalances in the strain gauge circuit are displayed on the indicating device, which registers variations in strain corresponding to temperature rises in the test material when it is subjected to pulsed radiation.

Other objects, features, and advantages of this invention will become apparent upon reading the following description of one embodiment of the invention, and referring to the accompanying drawings in which.

Figure 1:
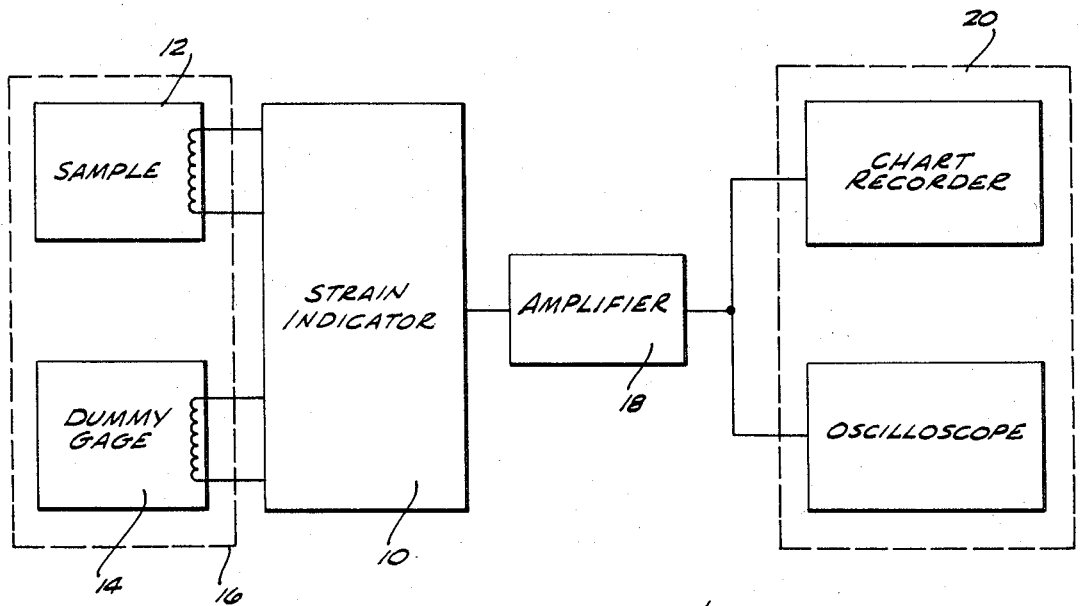
FIG. 1 is a block diagram showing the components forming the present system.

Referring to FIG. 1, the present system includes a strain indicator 10 which may be preferably a conventional Wheatstone bridge circuit with one strain gauge 12, attached to the sample of test material, and another strain gauge 14, attached to a dummy or reference material. In a conventional fashion these gauges form two legs of the bridge circuit. For more detail on conventional Wheatstone bridge circuits, reference may be made to any standard text on electricity and particularly the portion of the text relating to resistance measurements. In the present preferred embodiment, the strain gauges are conventional in detail such as SR-4 strain gauges manufactured by Baldwin-Lima-Hamilton Corp., Philadelphia, Pa. In a conventional way, the indicator 10 measured the linear deformation experienced by the sample material 12 relative to that of the reference material 14. Both the sample 12 and the reference 14 are placed in the radiation environment 16 to balance out the possible effect of the radiation on the strain gauge itself. One example of a typical radiation environment having pulsed nuclear radiation in which this system will function is a pulsed reactor. In the preferred embodiment, Teflon was used as the sample material and the strain gauge was bonded with an epoxy polyamid bonding agent, and a quartz plate is used as the reference material because of its small strain response to pulsed radiation.

The electrical output signal of the strain indicator may be coupled to an electronic amplifier circuit 18 such as a conventional D.C. current to voltage amplifier, and the electrical output signal of the amplifier circuit 18 is coupled to an indicating device 20 such as a conventional chart recorder or an oscilloscope. Thus, the thermal expansion of the sample is measured by comparing the signals from the sample and reference gauges as visually indicated by the indicating device 20.

Figure 2:
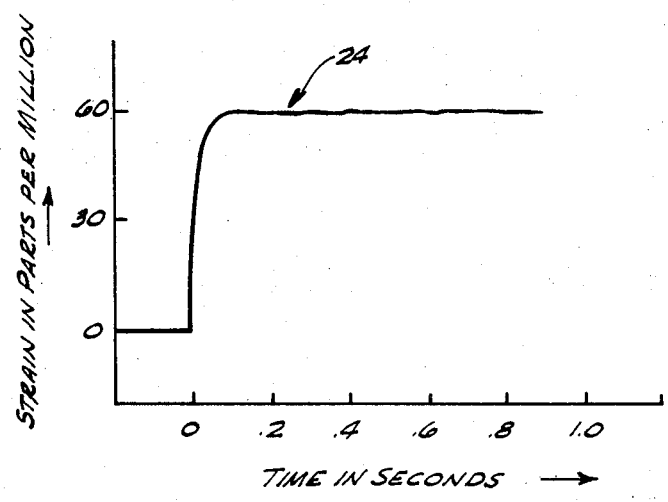
FIG. 2 is a graphic drawing illustrating the response of radiation induced strain in Teflon produced by a pulse of high energy electrons.

It has been further noted that the radiant energy absorbed by a material ($D$) can be calculated by the formula:

$$D = \frac{c}{\alpha}\left(\frac{\Delta L}{L}\right)$$

where
 $c$ = specific heat of material
 $\alpha$ = thermal expansion coefficient
 $L$ = length of sample Therefore, since the change in length ($\Delta L$) of the sample material is directly proportional to the change in resistance of the strain gauge, the radiant energy absorbed by the material can be evaluated. The electrical output signal of the Wheatstone bridge circuit corresponding to the radiant energy absorbed by the sample material can be readily indicated as shown by FIG. 2. This FIG. shows the radiant energy absorbed by a Teflon sample when it is subjected to pulsed radiation of $6 \times 10^4$ RADS at a sweep speed of 0.2 seconds per centimeter. The initial increase in strain as indicated at point 24 results from the thermal expansion produced by the pulsed radiation.

While the basic principle of this invention has been herein illustrated and has been described in one embodiment, it will be apparent by those skilled in the art that variations in the disclosed description both as to its details and as to organization of such details may be made without departing from the spirit and scope thereof. Accordingly, the foregoing disclosure and the showings made in the drawings are to be considered only as illustrative of the principles of the invention and not construed in a limiting sense.

We claim:

1. An apparatus for measuring pulsed radiation comprising:
    a strain indicator including a sample strain gauge and a reference strain gauge both located to receive pulses of nuclear radiation energy;
    said sample strain gauge being mechanically affixed to a sample material and the reference strain gauge being mechanically affixed to a material having a response to pulsed nuclear radiation energy less than that of said sample material;
    said sample strain gauge and said reference strain gauge being electrically coupled to form two legs of a Wheatstone bridge circuit; and
    indicator means electrically coupled to said bridge circuit and operative in response to electrical output signals therefrom to indicate when said circuit has an output whereby thermal strains of said sample material are shown on said indicator means;
    whereby subjecting said sample strain gauge and said reference strain gauge to pulses of nuclear radiation energy produces an indication of magnitude of said energy absorbed by said sample material.

2. The apparatus of claim 1 including an amplifier circuit electrically coupled between said Wheatstone bridge circuit and said indicator means to electrically amplify the electrical output signal from said bridge.

3. The apparatus of claim 1 wherein said reference strain gauge is mechanically affixed to a material having a substantially negligible strain response to pulsed nuclear radiation energy.